H. M. NAUGLE.
LUBRICATING SPRING BOLT.
APPLICATION FILED MAR. 20, 1919.

1,389,374.

Patented Aug. 30, 1921.
2 SHEETS—SHEET 1.

INVENTOR,
Harry M. Naugle,
BY Frease, Merkel, Saywell and Boud
ATTYS.

H. M. NAUGLE.
LUBRICATING SPRING BOLT.
APPLICATION FILED MAR. 20, 1919.

1,389,374.

Patented Aug. 30, 1921.
2 SHEETS—SHEET 2.

INVENTOR,
Harry M. Naugle,
BY Frease, Merkel, Saywell and Bond
ATTYS.

UNITED STATES PATENT OFFICE.

HARRY M. NAUGLE, OF CANTON, OHIO, ASSIGNOR TO THE ALLOY PARTS MANUFACTURING COMPANY, OF CANTON, OHIO, A CORPORATION OF OHIO.

LUBRICATING SPRING-BOLT.

1,389,374.    Specification of Letters Patent.    Patented Aug. 30, 1921.

Application filed March 20, 1919. Serial No. 283,855.

*To all whom it may concern:*

Be it known that I, HARRY M. NAUGLE, a citizen of the United States, residing at Canton, in the county of Stark and State of Ohio, have invented a new and useful Lubricating Spring-Bolt, of which the following is a specification.

The invention thus set forth in general terms is illustrated in the accompanying drawings forming part hereof, in which—

Figure 1:
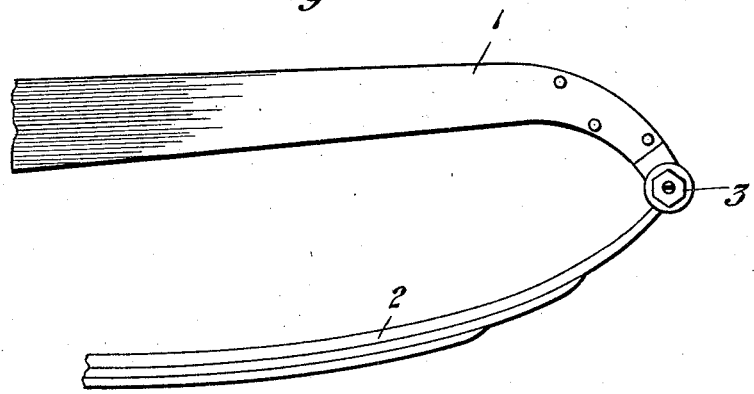
Figure 2:
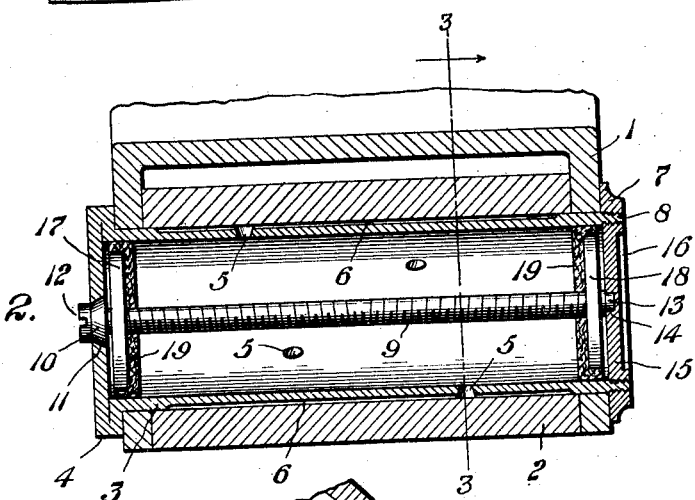

Figure 1 is a side elevation of a portion of a vehicle frame and spring with a pivotal connection embodying the invention;

Fig. 2, a longitudinal sectional view through the pivotal connection.

Figure 3:
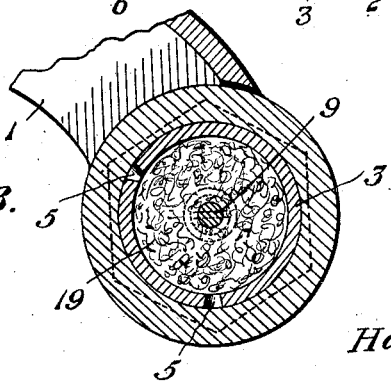
Figure 4:
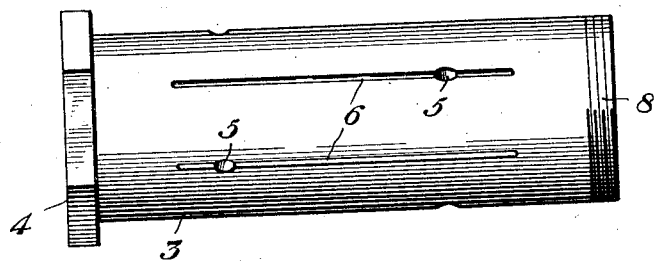
Figure 5:
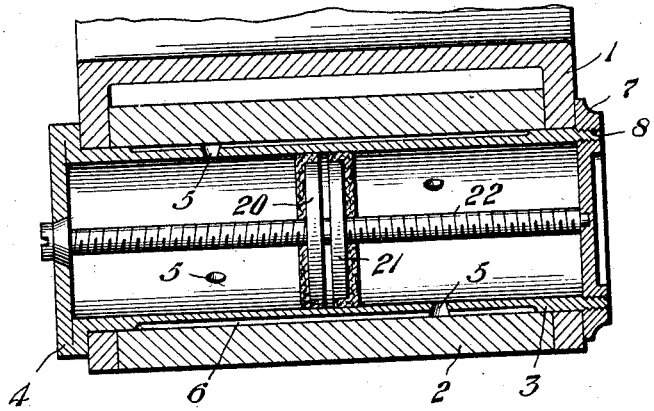
Figure 6:
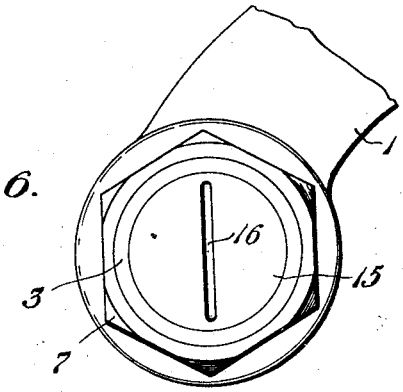

Fig. 3, a section on the line 3—3, Fig. 2;

Fig. 4, a side elevation of the bolt;

Fig. 5 shows a slightly modified form of the threaded rod and plunger construction; and Fig. 6 is an end view of the bolt and pivotal connection.

A practical embodiment of the invention is disclosed in the accompanying drawings, forming a part of this specification in which similar numerals of reference indicate corresponding parts throughout the several views.

A portion of the frame of the chassis of an automobile is shown at 1 and a portion of the leaf spring 2 is shown connected thereto by means of the bolt which is indicated generally by the numeral 3 in Fig. 1.

The bolt is made in the form of a hollow cylinder, preferably stamped from a sheet or plate of proper thickness, one end thereof being closed and upset forming the head 4, which is ground or machined to a hexagonal shape. Although it is preferred to form the bolt in this manner it may be formed without the head 4 and screw threaded upon this end and a nut placed thereon to take the place of the head 4.

The invention relates to lubricating spring bolts of the type used in automobiles and similar vehicles for connecting the springs to the frame of the machine or to the shackles; and the object of the invention is to provide a hollow lubricating bolt, the hollow interior of the bolt comprising a grease or oil chamber within which is located suitable means operable from the exterior to force grease or oil through apertures in the bolt to provide for the distribution of lubrication on the bearing surface; and to provide a simple and effective device of this character.

The objects of the invention may be attained by providing a hollow cylindrical bolt, preferably stamped from a sheet or plate and provided around its periphery with a plurality of apertures, each communicating with a lateral groove upon the outer surface of the bolt and by providing an oppositely threaded shaft within said bolt, plungers being mounted upon said shaft arranged to move laterally within the bolt to force grease or oil from the interior of the bolt through the apertures therein, the grooves communicating with said apertures providing a distribution of the lubrication upon the bearing surface.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

A grease or oil chamber is thus formed within the bolt and a plurality of apertures 5 are located at suitable intervals around the periphery of the bolt, each of these apertures communicating with a longitudinally disposed groove 6 in the outer surface of the bolt. The bolt is passed through the bearings in the frame and spring or through the bearings in a shackle and through the spring, the head 4 engaging the frame or shackle and a nut 7 is mounted upon the screw threaded extremity 8 of the bolt holding the same in position within the bearing.

The oppositely threaded shaft 9 is mounted through the longitudinal center of the bolt and provided upon one extremity with the conical head 10 which has a bearing within the countersunk aperture 11 in the bolt head, a slotted projection 12 being formed upon this head for the reception of a screw driver or coin for the purpose of rotating the threaded shaft. The other extremity of the shaft 9 is slightly reduced as shown at 13 and has a bearing in the socket 14 formed in the threaded disk 15 which closes the open end of the bolt. A slot 16 is formed in this disk for the reception of the screw driver.

Mounted upon the threaded shaft 9 are the oppositely threaded plungers 17 and 18. Each of these plungers is made in the form of a metal disk of slightly less diameter than the diameter of the grease chamber within the bolt and a washer 19 of felt or similar material is placed upon the inner face of each plunger over the edge thereof preventing leakage of grease or oil between the periphery of the plunger and the inner surface of the grease chamber.

In the form of the invention shown in Fig. 2, the plungers 17 and 18 are initially located near the extremities of the grease chamber and arranged to be moved toward each other with the rotation of the oppositely threaded shaft 9 to the left, forcing the grease or oil from the grease chamber, through the apertures 5 and filling the grooves 6, the lubricant being thus evenly distributed around the entire bearing surface of the bolt.

When it is desired to fill the grease chamber of the bolt with grease, the screw threaded shaft 9 is rotated to the right by means of a screw driver or coin placed in the slotted head of the shaft, bringing the plungers into the initial position shown in Fig. 2. The threaded disk 15 is then removed and the plunger 19 is removed from the threaded shaft, and the grease chamber is then packed with grease after which the plunger 19 is placed upon the outer extremity of the threaded shaft and the disk 15 replaced within the open extremity of the bolt.

In order to keep the bearing properly lubricated, a screw driver or coin is from time to time placed in the slotted head of the screw threaded shaft and given a few turns to the left drawing the plungers toward each other and forcing the grease through the apertures 5 and into the grooves 6, distributing the lubricant around the bearing surface.

In the modification shown in Fig. 5, the plungers 20 and 21 are initially located near the longitudinal center of the grease chamber and arranged to be moved away from each other with the rotation to the left of the oppositely threaded shaft 22, thus dividing the interior of the bolt into two grease chambers of equal capacity and arranged to decrease these chambers equally in size as the plungers are moved toward the extremities of the bolt forcing the grease or oil from the grease chambers through the apertures 5 and filling the grooves 6, the grease or oil being thus evenly distributed around the entire bearing surface of the bolt.

When it is desired to fill the grease chamber of the bolt shown in Fig. 5, the screw threaded shaft 22 is rotated to the right, bringing the plungers 20 and 21 into the initial position shown in Fig. 5. The threaded disk 15 is then removed and the shaft 22 is removed from the interior of the bolt, after which the interior of the bolt is packed with grease from the head 11 to a point near the longitudinal center of the bolt. The shaft 22 is then returned to its place within the bolt and the remaining half of the chamber is filled with grease and the disk 15 is replaced, closing the grease chamber.

This form of bolt is operated in the same manner as that shown in Fig. 2, a coin or other thin, flat object being used to turn the shaft 22. It will be noted that as this shaft is rotated to the left the plungers 20 and 21 are drawn toward the opposite extremities of the bolt forcing the grease through the apertures 5.

Although the bolt is illustrated as connecting one end of a spring to the automobile frame it will be understood that this bolt is also used to connect the spring to the shackles and it is applicable and desirable at any point where a bolt is utilized as a bearing connection.

By forming the bolt in the shape of a hollow cylinder such as the stamped article shown and utilizing the entire interior of the bolt for a grease chamber, the difficulties and unsatisfactory features of the usual forms of lubricating bolts are overcome. A common construction of lubricating bolt is one in which a grease cup is located on one end of the bolt, communicating with an axial bore, of small diameter, in the bolt. This form of bolt easily clogs and must be frequently cleaned to be kept in working order, and owing to the necessarily small grease cup it is not possible to put sufficient grease in the cup to last for any considerable length of time.

In the present construction the grease chamber within the bolt will contain several times the amount of grease which it is possible to place in the usual grease cup and owing to the large diameter of the grease chamber within the bolt all possibility of the grease clogging therein is obviated.

I claim:

1. A hollow bearing bolt having an aperture through its side and provided with a head upon one extremity and with internal and external screw threads upon the other extremity, a threaded disk closing the screw threaded extremity, a nut mounted upon the screw threaded extremity, a screw threaded shaft provided with a conical head journaled in the head of the bolt, the other end of said shaft being journaled in said disk and a plunger mounted upon said screw threaded shaft to compress a lubricant within the bolt and force it through said aperture.

2. A hollow bearing bolt having an aperture through its side and provided with an integral wall closing one end, a removable disk closing the other end of the bolt, an integral head formed upon one end of the bolt, screw threads upon the opposite end of the bolt for the reception of a nut, a screw threaded shaft journaled in said wall and disk and a plunger upon said shaft for compressing a lubricant within the bolt and forcing it through said aperture.

In testimony that I claim the above, I have hereunto subscribed my name.

HARRY M. NAUGLE.